Patented Jan. 12, 1937

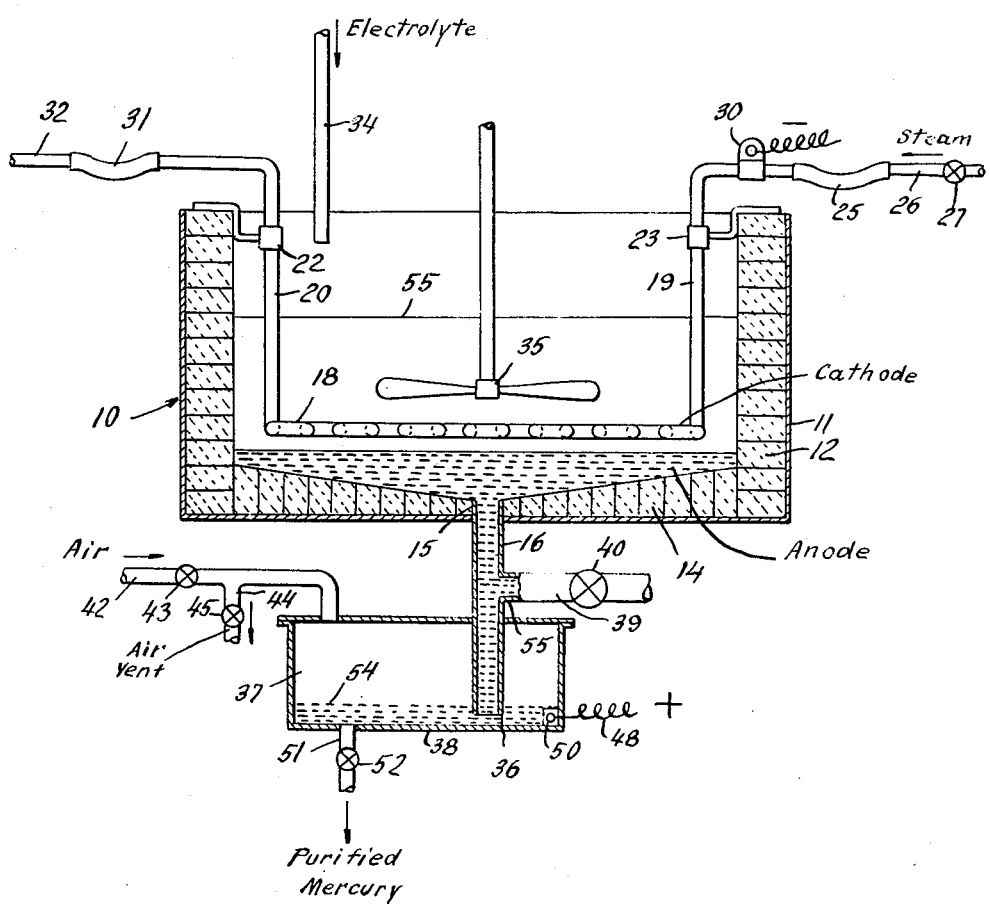

2,067,361

UNITED STATES PATENT OFFICE 2,067,361

ELECTROLYTIC PURIFICATION

Robert E. Vivian, Garden City, N. Y., assignor to General Chemical Company, New York, N. Y., a corporation of New York Application December 31, 1934, Serial No. 759,819

5 Claims. (Cl. 204—9)

This invention relates to the purification of mercury, particularly by anodic corrosion of impure mercury.

As known, certain metals, for example those of the iron group, are soluble in and/or amalgamate with mercury to a considerable extent. One instance of previously suggested utilization of this principle is in the production of iron-free aluminum sulfate. Steps involved in this procedure comprise electrolysis of an aluminum sulfate solution containing iron as an impurity, employing mercury as the cathode and the aluminum sulfate solution to be purified as the electrolyte. The iron, present in the solution for example as ferric sulfate, amalgamates with the mercury constituting the cathode. The amount of iron which amalgamates with the mercury is limited. Hence, a condition is reached where the amalgamated mercury in the electrolytic cell should be replaced with substantially pure mercury. Since mercury is expensive, one of the problems encountered in attempts to commercially utilize mercury as the cathode in the electrolytic purification of liquors, lies in the provision of satisfactory methods for subsequent purification of the amalgamated mercury. For this purpose, certain methods have been proposed for treating the mercury to remove impurities. Prior methods for separating impurities from mercury have not been sufficiently successful, chiefly on account of high treating costs or of the heavy loss of mercury, to permit general use of mercury as the cathode in large scale electrolytic methods for purifying liquors such as aluminum sulfate. Hence, liquor purification methods of this nature have not gone into extensive commercial use.

The principal object of the invention is directed to the provision of commercially economical methods for purifying mercury. In this connection, one of the primary aims of the invention is to provide cheap methods whereby mercury may be separated from impurities and recovered in a substantially pure state without appreciable loss of mercury. Another object is the provision of methods for electrolytically purifying mercury. A further important object lies in the provision of methods for electrolytic purification of mercury in which the electrolyte employed is regenerated during purification of the mercury, thus adding substantially to the economies of the process.

For convenience, the invention will be described for illustrative purposes in connection with the purification of mercury containing impurities such as iron separated from an iron containing solution such as aluminum sulfate. However, it will be understood the invention comprehends separation from mercury of other impurities from other sources. In general, the method of the invention may be applied to separation from mercury of metals such as nickel, cobalt, chromium, molybdenum, tin, thallium, zinc, manganese, cadmium, copper, lead, and bismuth, which metals may have been separated as impurities for example from solutions of aluminum, magnesium, alkaline-earth and alkali-metal salts.

In carrying out one preferred embodiment of the process of the invention, purification of mercury, for example to remove metals such as those of the iron group, is effected by electrolysis of an alkali metal sulfate solution using the impure mercury as the anode. Any suitable metal, as iron or lead, may be employed as the cathode. When electrolyzed in the alkali metal sulfate solution, the iron is removed from the mercury evidently as a ferrous sulfate solution which reacts with alkali metal hydroxide formed at the cathode to produce a precipitate of iron hydroxide, and regenerate the alkali metal sulfate electrolyte solution. On completion of the removal of iron or other impurities from the mercury anode, the purified mercury and the electrolyte solution containing the iron hydroxide are separated. The iron hydroxide precipitate settles in the electrolyte solution and may be readily separated therefrom. The alkali metal sulfate solution is then used as electrolyte solution in the separation of impurities from further quantities of impure mercury.

An understanding of the invention and a further appreciation of the objects and advantages thereof may be had from a consideration of the following description taken in connection with the accompanying drawing showing in vertical section one form of apparatus which may be employed in carrying out the process of the invention.

Referring to the drawing, the vat or cell 10 comprises a steel tank 11 lined with acid resistant brick 12. The cell may be circular in horizontal cross-section, bottom 14 having a sloping inner surface terminating in an outlet opening 15 formed to receive the upper end of a discharge pipe 16.

The cathode of the cell comprises a horizontally disposed coil 18 of lead or iron pipe, the inlet end 19 and the outlet end 20 of the coil projecting upwardly beyond the vertical sides of the cell. Coil 18 may be supported approximately in the position shown in the drawing by insulating brackets 22 and 23 which may conveniently be made so as to permit vertical adjustment of coil 18.

The inlet end 19 of the coil may be connected by a short conduit 25, of insulating material such as rubber hose, to the end of a steam supply pipe 26 containing a control valve 27. The negative side of an electric circuit is attached to coil end 19 as by a clamp 30. The outlet end 20 of the pipe coil is inserted in a hose connection 31 by means of which the coil may be insulated from a steam outlet pipe 32.

Electrolyte solution is fed into the cell through an inlet pipe 34. An agitator 35 is revolvably mounted in the cell approximately as indicated on the drawing.

The lower end 36 of discharge pipe 16 opens into and is spaced a short distance above the bottom of a chamber 37 in an air-tight casing 38. Connected to pipe 16 above the top of casing 38 is a by-pass discharge pipe 39, having a control valve 40. Compressed air may be introduced into chamber 37 through pipe 42, controlled by valve 43, and air may be vented from chamber 37 through valve-controlled pipe 44. Conductor 48 connected to the positive side of the electric circuit passes through casing 38, and is attached to a copper terminal 50 in the bottom of chamber 37. It will be understood the electric circuit connected to the cell at 30 and 50 includes standard equipment such as a variable resistance, a voltmeter and an ammeter for regulating the voltage and current supplied to the cell.

In carrying out the process, the mercury to be purified is introduced into the cell in quantity preferably such as to at least cover the bottom of the cell. Valves 40, 45 and 52 are closed, and compressed air is introduced into chamber 37 through pipe 42 and valve 43 at pressure sufficient to lower the surface of the mercury in chamber 37 to about line 54, and maintain the level of mercury in the bottom of the cell approximately as indicated in the drawing so that a continuous layer of mercury may be maintained over the entire bottom of the cell during operation.

The electrolyte employed is preferably a solution of an alkali metal sulfate, such as sodium or potassium sulfate. A 10% solution of either may be used to advantage. The solution is run in through pipe 34 to fill the cell to approximately the level of line 55. Agitator 35 is started, and the electric circuit through the cell closed. It has been found that particularly satisfactory results may be obtained when the source of power is regulated so as to provide in the cell a current density of about 50 amperes per square foot of mercury anode and a potential of about 4–6 volts at about one inch separation of anode and cathode with an electrolyte temperature of 60–100° F.

According to this procedure, it will be seen the impure mercury in the bottom of the cell acts as the anode and the lead coil 18 as the cathode. On passage of the current, the alkali metal sulfate solution, such as sodium sulfate, is electrolyzed, and the sulfate radical is liberated at the mercury anode. Sulfate combines with the iron in the mercury to apparently form ferrous sulfate, although indications are that some ferric sulfate may also be formed. At the lead cathode, sodium is liberated and reacts with water in the electrolyte solution to form sodium hydroxide and generate hydrogen which is set free as gas at the cathode. The sodium hydroxide thus formed at the cathode in turn reacts with the iron sulfate to form an iron hydroxide precipitate, and regenerate the sodium sulfate solution. As the process goes on, the desired concentration of the electrolyte solution may be maintained by the addition of water from time to time as required.

Solutions other than sodium and potassium sulfate, such as the nitrate or chloride of sodium or potassium may be used as the electrolyte. Generally, in the electrolyte, a salt of any metal may be used which forms hydroxides soluble in water, and any acid radical may be used which liberates oxygen upon electrolysis.

When carrying out the process, agitator 35 may be driven at a rate such as to impart by friction some agitation to the surface of the mercury anode, to thus promote transfer of ferrous sulfate formed at the anode to the cathode. Agitation also keeps the iron hydroxide precipitate suspended in the electrolyte liquor, and prevents settling of the iron hydroxide to the surface of the mercury thus permitting the process to proceed without an interference of a layer of iron hydroxide which might otherwise become established at the top of the mercury and become a source of annoyance or trouble.

It has been found that during electrolysis, the temperature of the electrolyte solution may be about normal, say around 60–100° F., or steam may be introduced into the coil to maintain the electrolyte at any desired temperature. With the arrangement shown in the drawing, the lead coil acts as a heating unit and as the cathode. It will be understood a separate heating coil and a separate cathode may be employed if desired.

The degree of purification of mercury may be determined by sampling the mercury from time to time during progress of the process. When removal of impurities from the mercury is complete, valve 45 in vent pipe 44 is opened to permit the purified mercury to run through pipe 16 into chamber 37, the air pressure in chamber 37 being regulated so as to maintain the upper surface of the mercury in discharge pipe 16 at approximately the lower side 55 of pipe 39. Valve 40 in pipe 39 is then opened, and the electrolyte solution containing the iron hydroxide in suspension runs out of the cell through pipes 16 and 39. The iron hydroxide settles readily in the sodium sulfate solution, and may be separated therefrom by decantation or otherwise. The sodium sulfate solution is then used as electrolyte in purification of further quantities of mercury. Purified mercury is drawn off through pipe 51. Tests indicate that substantially no mercury is found in either the electrolyte solution or the iron hydroxide precipitate.

I claim:

1. The method for separating iron from mercury containing the same which comprises forming an electrolytic cell including a cathode, and an anode of the impure mercury in contact with an electrolyte, and passing an electric current through the cell under conditions so as to provide therein a current density of about 50 amperes per square foot of mercury anode and a potential of about 4–6 volts to separate iron from the mercury.

2. The method for separating iron from mercury containing the same which comprises forming an electrolytic cell including a cathode, and an anode of the impure mercury in contact with an electrolyte solution, passing an electric current through the cell under conditions so as to provide therein a current density of about 50 amperes per square foot of mercury anode and a potential of about 4-6 volts to transfer iron from the mercury to the electrolyte solution, precipitating the iron from the electrolyte solution, and separating mercury from the electrolyte.

3. The method for separating metals of the iron group from mercury which comprises forming an electrolytic cell including a cathode, and an anode of mercury containing a metal of the iron group in contact with an alkali metal sulfate electrolyte, and passing an electric current through the cell under conditions so as to provide therein a current density of about 50 amperes per square foot of mercury anode and a potential of about 4-6 volts to separate metal of the iron group from the mercury.

4. The method for removing iron from mercury containing the same which comprises forming an electrolytic cell including a cathode and an anode of the mercury in contact with an alkali metal sulfate electrolyte solution, passing an electric current through the cell under conditions so as to provide therein a current density of about 50 amperes per square foot of mercury anode and a potential of about 4-6 volts to remove iron from the mercury and form iron sulfate in the electrolyte solution, regenerating electrolyte solution by precipitating iron hydroxide at the cathode, separating mercury from the electrolyte solution, separating iron hydroxide from the electrolyte solution, and utilizing the solution as electrolyte in purifying further quantities of mercury.

5. The method for separating metals of the iron group from mercury which comprises forming an electrolytic cell including a cathode, and an anode of mercury containing a metal of the iron group in contact with an electrolyte solution comprising a compound of a metal the hydroxide of which is soluble in water, and passing an electric current through the cell under conditions so as to provide therein a current density and a potential such as to separate metal of the iron group from the mercury.

ROBERT E. VIVIAN.